United States Patent Office 2,772,294
Patented Nov. 27, 1956

2,772,294

1,2,3,4,10,10 - HEXACHLORO - 1,4 - METHANO - 5,8-OXA - 1,4,4a,5,8,8a - HEXAHYDRO-5-NAPHTHALDEHYDE

Morton Kleiman, Chicago, Ill., assignor to Velsicol Chemical Corporation, a corporation of Illinois No Drawing. Application July 14, 1953,
Serial No. 367,969

1 Claim. (Cl. 260—346.2)

This invention relates to the production of a new polycyclic insecticidal composition of matter characterized by containing an oxygen bridge and functional aldehyde group. More specifically, this invention relates to the production of 1,2,3,4,10,10-hexachloro-1,4-methano-5,8-oxa-1,4,4a,5,8,8a-hexahydro-5-naphthaldehyde.

Furans with oxygen-containing side chains can be reacted with 1,2,3,4,7,7-hexachlorobicyclo-[2.2.1]-2,5-heptadiene to form a Diels-Alder adduct. While adducts having oxygen-containing side chains can be prepared in such manner, it has heretofore been impossible to prepare the adduct of hexachlorobicyclo-[2.2.1]-2,5-heptadiene with furfural. This is unusual since the oxygen-containing side chain of furfural is merely a simple aldehyde group and should not interfere with the reaction. However, because of the extreme reactivity of the aldehyde group and the great insecticidal activity of the polycyclic ring structure of the bridged naphthalene compounds, it is highly desirable that the two be combined in a single material. This desirable end while not possible by direct methods is accomplished by an indirect process in accordance with the present invention. This method is the oxidation of 1,2,3,4,10,10-hexachloro-1,4-methano-5-hydroxymethyl - 5,8 - oxa - 1,4,4a,5,8,8a - hexahydro - naphthalene in such a manner as to selectively convert the hydroxymethyl group in the number 5 position to aldehyde. The production of the hydroxymethyl material from furfuryl alcohol by adduction of the latter with 1,2,3,4,7,7 - hexachlorobicyclo - [2.2.1] - 2,5 - heptadiene is described and claimed in my copending United States application, Serial No. 367,967, filed July 14, 1953, now U. S. Patent 2,705,235.

The method of oxidation is known as the Oppenauer oxidation which converts the 5-hydroxymethyl group to the aldehyde group. The materials used as oxidizing agents are aluminum alkoxides or phenoxides, such as aluminum phenoxide, aluminum isopropoxide, and aluminum tert-butoxide in conjunction with a hydrogen acceptor such as acetone, cyclohexanone, or quinone.

Additional solvents may be used if desired, though in many cases they serve no useful purpose since the hydrogen acceptor, usually present in excess, likewise acts as a solvent. Additional solvents may be inert hydrocarbons such as benzene, toluene, xylene or the like, which are inert to the reactants employed.

Since this oxidation reaction is fairly mild, the reaction is generally fairly slow. Between about 2 hours and 24 hours is a suitable time of reaction.

The temperature of the reaction is best held between about 20° C. and 140° C. Generally, the reflux temperature of the reaction media will be sufficient to produce the product in good yield.

The following example illustrates the preparation of the 5-naphthaldehyde using aluminum phenoxide. The aluminum phenoxide utilized was prepared by reacting phenol (99.5 grams) and aluminum shavings (10) grams. The mixture was fused and heating continued until hydrogen evolution ceased. The mixture was allowed to cool and the solid product granulated. The product was used in the oxidation procedure without further purification.

EXAMPLE

*Preparation of 1,2,3,4,10,10-hexachloro-1,4-methano-5,8-oxa-1,4,4a,5,8,8a-hexahydro-5-naphthaldehyde*

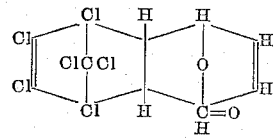

Into a 250 ml. 3-necked flask equipped with a stirrer, thermometer, and reflux condenser with attached drying tube is placed 1,2,3,4,10,10 - hexachloro - 1,4 - methano - 5 - hydroxymethyl - 5,8 - oxa - 1,4,4a,5,8,8a - hexahydro - naphthalene (0.024 mole; 9.1 grams), aluminum phenoxide (13.5 grams), and acetone (200 ml.). The contents of the flask are heated at reflux for 24 hours. The unreacted acetone is removed by distillation and the residue containing the product is chilled to about 5° C. and extracted with cold diethyl ether. The ether solution is washed successively with cold dilute aqueous $H_2SO_4$, aqueous sodium carbonate, and water. The ether is then removed by evaporation and the aldehyde product thus recovered.

The aldehyde group contained in the composition of the present invention makes it possible to prepare many useful derivatives of an already insecticidal material. Other chemical substituents may be incorporated into the molecule by reaction of certain reagents with the aldehyde group. The incorporation of additional functional groups can impart fungitoxic properties to the insecticidal material and enhance its commercial value by creating an economic poison of multiple utility.

While the aldehyde group of the composition of the present invention presents many interesting possibilities for further substitution, the unmodified aldehyde is of itself an excellent insecticide. The toxicity is sufficiently high so as to control insect depredation when applied in the field at rates of less than one pound per acre.

The product of the present invention is useful as an insecticide when applied to the insects or their habitats. The insecticidal material may be applied in the form of dusts, sprays, baits, emulsions, aerosols or fogs. It may be used alone or in conjunction with other insecticides or synergistic compounds.

I claim as my invention:

As a new composition of matter 1,2,3,4,10,10-hexachloro - 1,4 - methano - 5,8 - oxa - 1,4,4a,5,8,8a - hexahydro - 5 - naphthaldehyde.

References Cited in the file of this patent

UNITED STATES PATENTS

| | | |
|---|---|---|
| 2,655,513 | Kleiman | Oct. 13, 1953 |
| 2,655,514 | Kleiman | Oct. 13, 1953 |